US008024542B1

(12) United States Patent
Chatterjee et al.

(10) Patent No.: US 8,024,542 B1
(45) Date of Patent: Sep. 20, 2011

(54) ALLOCATING BACKGROUND WORKFLOWS IN A DATA STORAGE SYSTEM USING HISTORICAL DATA

(75) Inventors: Paresh Chatterjee, Fremont, CA (US); Ajit Narayanan, Chennai (IN); Loganathan Ranganathan, Fremont, CA (US); Sharon Enoch, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 753 days.

(21) Appl. No.: 12/101,251

(22) Filed: Apr. 11, 2008

Related U.S. Application Data

(60) Provisional application No. 60/923,225, filed on Apr. 13, 2007.

(51) Int. Cl.
*G06F 12/00* (2006.01)
(52) U.S. Cl. .................................. 711/170; 711/154
(58) Field of Classification Search .................. 711/154, 711/170, 171
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Gooddlander et al. | |
| 5,502,836 A | 3/1996 | Hale et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,275,898 B1 | 8/2001 | DeKoning | |
| 7,360,051 B2 | 4/2008 | Sugino et al. | |
| 7,404,102 B2 | 7/2008 | Soran et al. | |
| 7,730,531 B2* | 6/2010 | Walsh ........................... 726/22 |
| 2005/0055402 A1 | 3/2005 | Sato | |
| 2005/0165925 A1* | 7/2005 | Dan et al. ..................... 709/224 |
| 2005/0188075 A1* | 8/2005 | Dias et al. ..................... 709/224 |
| 2006/0031648 A1* | 2/2006 | Ishikawa et al. ............. 711/162 |
| 2006/0031649 A1 | 2/2006 | Murotani et al. | |
| 2006/0130042 A1* | 6/2006 | Dias et al. ..................... 717/168 |
| 2006/0243056 A1* | 11/2006 | Sundermeyer et al. ......... 73/760 |
| 2006/0248273 A1 | 11/2006 | Jernigan et al. | |
| 2008/0104343 A1 | 5/2008 | Miyagaki et al. | |

(Continued)

OTHER PUBLICATIONS

Burtscher, Martin, et al., "Prediction Outcome History-based Confidence Estimation for Load Value Prediction," Department of Computer Science, University of Colorado., Journal of Instruction-Level Parallelism 1, published May 1999, p. 1-25.*

(Continued)

*Primary Examiner* — Pierre-Michel Bataille
(74) *Attorney, Agent, or Firm* — McKeon, Meunier Carlin & Curfman

(57) ABSTRACT

Technologies are described for implementing a system that schedules background workflows in a storage system. The background workflows may be automated maintenance tasks that require data movement, or any other tasks that would otherwise compete with normal input/output operations. Historical load statistics can be analyzed to estimate the preferred times in the future during which to schedule background workflows. After collecting data access statistics and usage patterns for several days or weeks, a number of averages can be calculated from the statistics at various natural periods of system utilization. For example, daily, weekly, or other periods. A weighted average can be established where weighting can place more emphasis on recent data. Such averages can serve as predictors of future loads having similar periodic relationships to the historical load data. Predicting future loads can improve the scheduling of background operations by avoiding conflicts with normal system operations.

17 Claims, 7 Drawing Sheets

U.S. PATENT DOCUMENTS

2008/0320247 A1   12/2008   Morfey et al.

OTHER PUBLICATIONS

U.S. Appl. No. 12/101,236, filed Apr. 11, 2008, entitled "Data Migration Between Multiple Tiers in a Storage System Using Age and Frequency Statistics," Inventors: Chatterjee et al.

U.S. Appl. No. 12/101,238, filed Apr. 11, 2008, entitled "Data Migration Between Multiple Tiers in a Storage System Using Pivot Tables," Inventors: Chatterjee et al.

U.S. Appl. No. 12/101,241, filed Apr. 11, 2008, entitled "Allocating Background Workflows in a Data Storage System Using Autocorrelation," Inventors: Chatterjee et al.

U.S. Official Action dated Oct. 28, 2010 in U.S. Appl. No. 12/104,135.

U.S. Official Action dated Dec. 2, 2010 in U.S. Appl. No. 12/104,123.

U.S. Official Action dated Dec. 22, 2010 in U.S. Appl. No. 12/101,236.

\* cited by examiner

ALLOCATING BACKGROUND WORKFLOWS IN A DATA STORAGE SYSTEM USING HISTORICAL DATA

CROSS-REFERENCE TO RELATED APPLICATIONS

This application claims the benefit of U.S. provisional patent application No. 60/923,225, filed on Apr. 13, 2007, and entitled "Novel Method of Providing Quotas to Schedule Background Workflows in a Storage System Using Historical Data" which is expressly incorporated herein by reference in its entirety.

BACKGROUND

A virtualized cluster is a cluster of different storage nodes that together expose a single storage device. Input/output (I/O) operations sent to the cluster are internally re-routed to read and write data to the appropriate locations. In this regard, a virtualized cluster of storage nodes can be considered analogous to collection of disks in a Redundant Array of Inexpensive Disks (RAID) configuration, since a virtualized cluster hides the internal details of the cluster's operation from initiators and presents a unified device instead.

A virtualized cluster can field I/Os from one or more initiators. In addition to servicing these initiator I/Os, the system internally processes internal operations including I/O operations. Such operations can be processed in the background to provide functionality such as data migration, adaptive network compression, boot data analysis, volume mirroring, defragmentation, or other internal maintenance operations. These background operations can compete with initiator I/O operations for resources such as disk access, CPU cycles, memory, network bandwidth, and so on. If the background operations are scheduled during a period of very high I/O activity from initiators, a drop in performance may be experienced as decreased throughput and increased latency of the storage system.

However, storage systems do not generally run at full load all the time. Instead, the load on a storage system can fluctuate with usage patterns of end users and the applications that store and access data in the storage system. More often than not, these patterns conform to human patterns, with the load on data systems often peaking during working hours, and having lulls during nights and weekends. Additionally, there may be patterns that recur on a weekly basis, such as a higher load every Friday, or on a monthly or yearly basis.

Predicting the amount of load that is expected on the system during various time periods in the future can provide for intelligent scheduling of background I/O operations. Improved allocation of background operations may reduce system overload and also may reduce the impact on production performance. For example, background I/O operations may be intelligently scheduled to coincide with periods of otherwise low system load.

It is with respect to these considerations and others that the disclosure made herein is presented.

SUMMARY

Technologies are described herein for implementing a system that schedules background workflows in a storage system. The background workflows may be automated maintenance tasks that perform adaptive network compression, boot data analysis, data migration, mirroring, or other tasks that would otherwise compete with normal I/O operations for various storage system resources. Historical load statistics for the system can be collected and maintained. The historical load data can be analyzed to estimate preferred times in the future for scheduling background workflows. After collecting data access statistics and data I/O patterns for several days and/or weeks, a number of averages can be calculated from the statistics. Such averages can correspond to the hourly average load at different natural periods of system utilization. For example, daily, weekly, or other periodicities. A weighted sum of these averages can be established for each hour of the day. The weighting can be imposed such that more weight is given to more recent data. The weighted sums may be sorted in ascending order so that the hour of the day with the lowest estimated load is given the maximum priority when allocating future background I/O operations.

According to one embodiment, the expected I/O load on a data storage system can be estimated for the next hour, or any given hour. A module can operate periodically to collect and maintain historical load data about the data access patterns of the system. An hourly average and a weighted weekly average can both be calculated from the historical load data. These two averages can be used to estimate the load for the next hour.

According to another embodiment, a background workflow quota can be provided for the next hour. This quota can represent the maximum number of background operations that can be performed with reduced impact on primary I/O operations, such as initiator data access. A peak load can be detected for the system. Such a peak load can serve as a proxy for the practical maximum of operations supported by the system. The data access load for the next hour can be estimated. A permitted background load can be calculated by subtracting the estimated load from the peak load. When the permitted load is determined in capacity per time units it can be converted to a number of migrations per hour by factoring in the size of a territory and the fact that a migration requires a double access to both read and write the data to be migrated. One example of allocating background operations is to specify a quota, or maximum, of territories that can be migrated. This quota can be provided to a module that migrates territories of data around the storage system in attempts to optimally position the data within the storage system.

Moreover, reducing the likelihood of background operations occurring during periods of high initiator load on the data storage system may improve the average I/O performance of the system. Additionally, the load on the underlying storage devices may be leveled or more evenly distributed over time. Such load balancing over time may contribute to longer average disk life.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
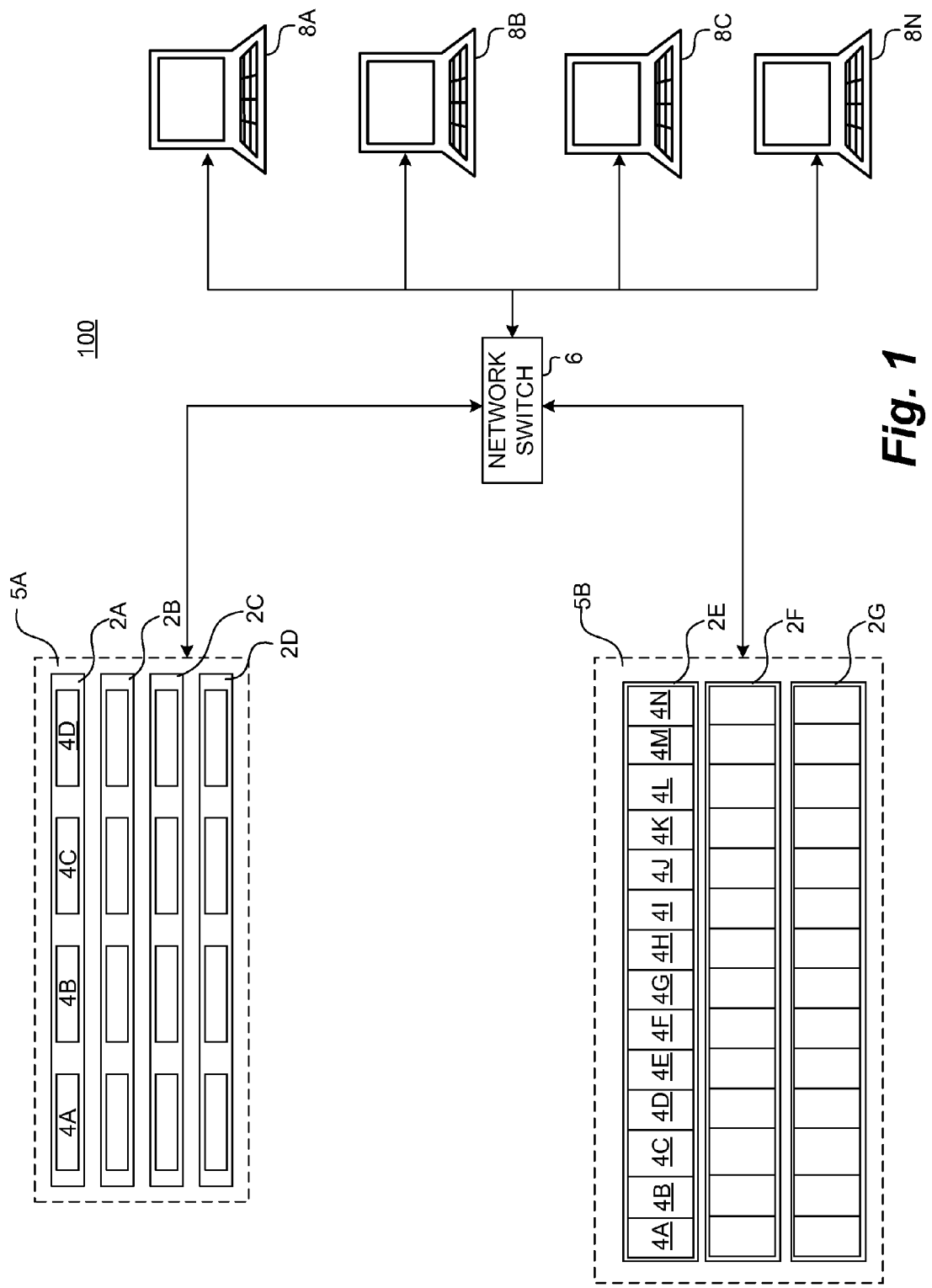
FIG. 1 is a network architecture diagram illustrating aspects of a storage system that includes several virtualized clusters according to one exemplary embodiment.

The following detailed description is directed to allocating background workflows in a data storage system using historical data. Through the use of the embodiments presented herein, historical load statistics can be analyzed to estimate the preferred times in the future during which to schedule background workflows. A number of averages from the historical data can be calculated for various natural periods of system utilization. Predicted future loads can improve the scheduling of background operations to avoid conflicts with normal system operations.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for allocating background workflow in a data storage system using historical load data will be described.

Turning now to FIG. 1, details will be provided regarding an illustrative operating environment for the implementations presented herein, as well as aspects of several software components that provide the functionality described herein for implementing data migration in a multitier storage system using age and frequency statistics. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
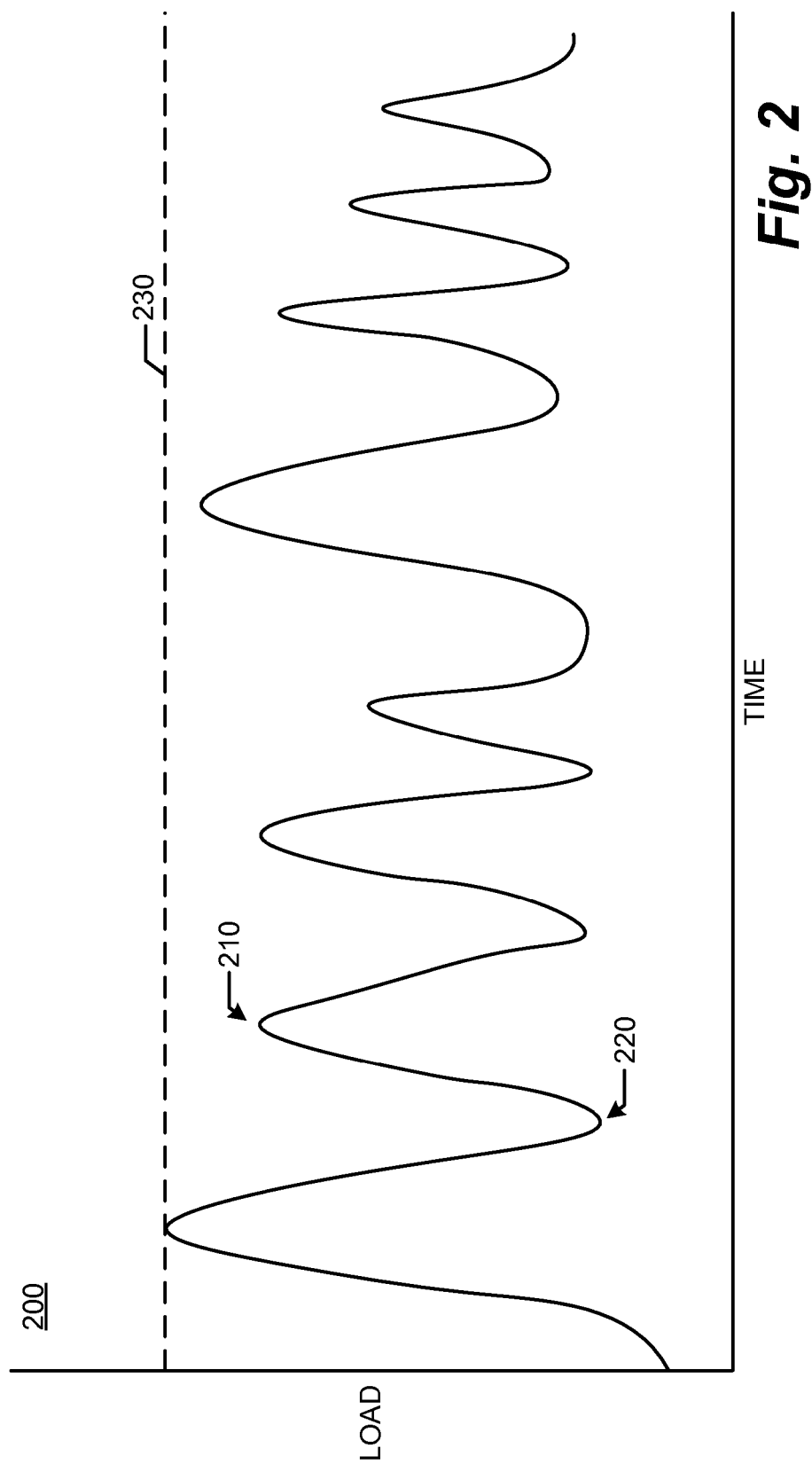
FIG. 2 is a statistical plot illustrating data access load statistics over time within a data storage system according to one exemplary embodiment.

Referring now to FIG. 2, a statistical plot illustrates data access load statistics over time within a data storage system according to one exemplary embodiment. The horizontal axis of the plot 200 represents time and the vertical axis represents the load. The load can encompass any combination of various parameters such as CPU utilization, memory utilization, network bandwidth load, or I/O load. Theoretically, the best time to process background operations may be when the load on the system is minimal. Thus, the various background modules or plug-ins can be allocated system resources during a low period, or trough 220, in the load as opposed to during the time of a peak 210 in the load.

It can be assumed that the load on the system may be a direct function of the load in the past. That is, the load for a future period can be predicted, in a statistical sense, by examining loads from the past. More specifically, the system load may be a superposition of various periodic loads. These periodic loads may correspond to a particular human-centric periodicity. For example, over the course of a day, roughly periodic troughs and peaks in the load may be observed depending, for example, on when employees come to work and when they leave. Over the course of a week, periods of relaxed load such as nights and weekend may be observed. Over the course of a year, certain days may be holidays year after year and display low loading. In this manner, an expected system load can be predicted, or estimated, from past loads.

In many systems, there may always be some load on the system and only the magnitude of the load may vary from lows to highs in a somewhat cyclical fashion. Hence, waiting for a time with no load in order to perform background tasks, for example data migration, may not be possible or efficient. One approach is to allocate background workflows at all times while scheduling more background work at low points in the system load and less background work during peaks in the system load.

The total work capacity of the system can be estimated. For example, the highest recent peak, or a local maxima 230, in the load can serve as a proxy for the total work capacity of the system. Subtracting the expected load from this peak capacity can predict the available system capacity during some period in the future for which the expected load was predicted.

Figure 3:
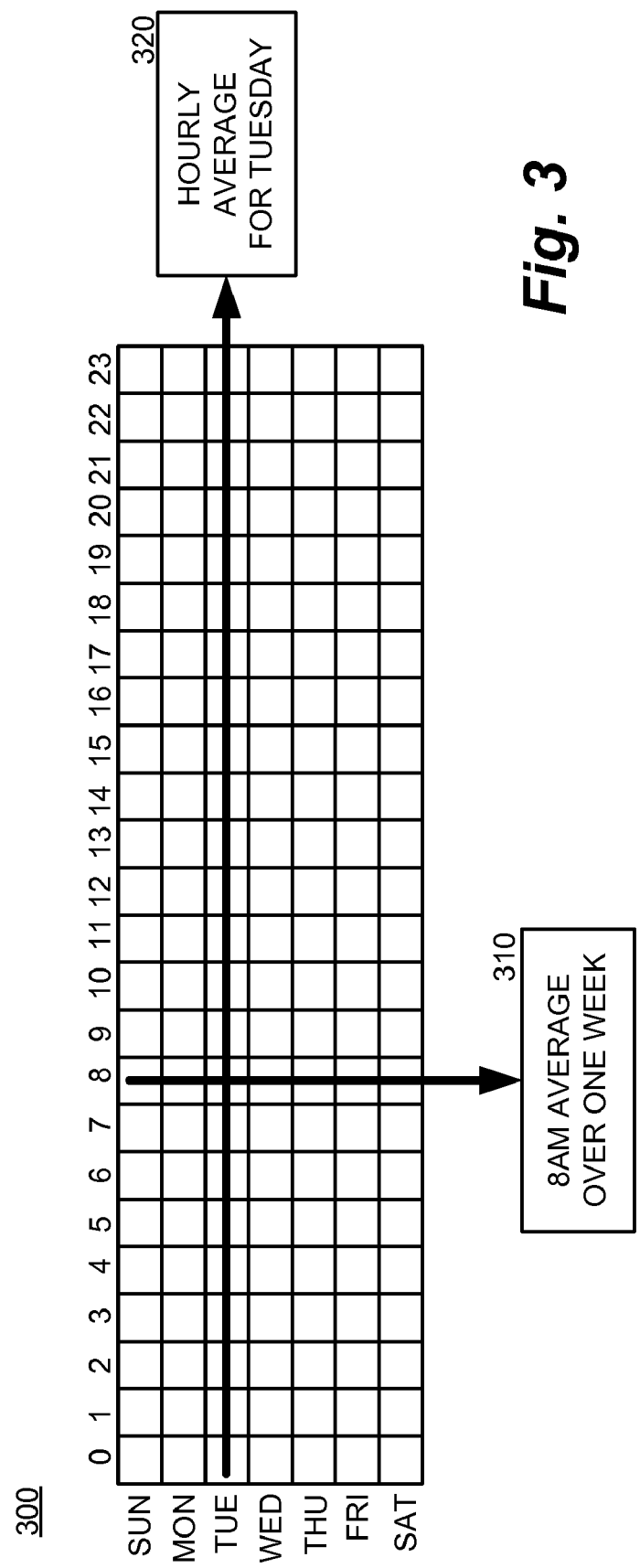
FIG. 3 is a data structure diagram illustrating a set of load statistics and the generation of daily and weekly load averages in a data storage system according to one exemplary embodiment.

Referring now to FIG. 3, a data structure diagram 300 illustrates a set of load statistics and the generation of daily and weekly load averages in a data storage system according to one exemplary embodiment. The data structure 300 can store an hourly load average for every hour of the day for a week. The data structure 300 can be visualized as a table. In FIG. 3, the hours of the day, in 24-hour format, are shown along the top of the table 300 and the days of the week are shown down the side of the table 300. Data related to the table 300 can be collected by a background operation. For example, a periodic collection thread can store system load data from the for every hour. Of course, data collection, or sampling, periods other than one hour may also be used.

Adding up all of the entries across a horizontal row of the table 300 and dividing by 24 can provide an hourly average load for that day. For example, the third row of the table 300 can be averaged to calculate an hourly average 320 for Tuesday of that week. Similarly, adding up all of the entries down a vertical column of the table 300 and dividing by seven can provide an hourly average load for a given hour of each day over the course of a week. For example, the ninth column of the table 300 can be averaged to calculate an 8 AM average 310 over one week. The hourly average 320 for Tuesday and the 8 AM average 310 over one week can both be averaged together to establish a predicted load value for a future Tuesday at 8 AM.

The load data that is collected for every hour can be maintained on multiple granularities. For example, the data collected every hour can be maintained in its entirety for the last X days and then daily averages can be maintained for the Y days prior to that. According to one embodiment, X may be 100 and Y may be 1000. Thus, hourly data for the last 100 days can be maintained along with 1000 days worth of daily averages for the period ranging from 100 to 1100 days ago. Other granularities of maintained data, or number of different granularities, or quantities of maintained data for each granularity may also be used.

Figure 4:
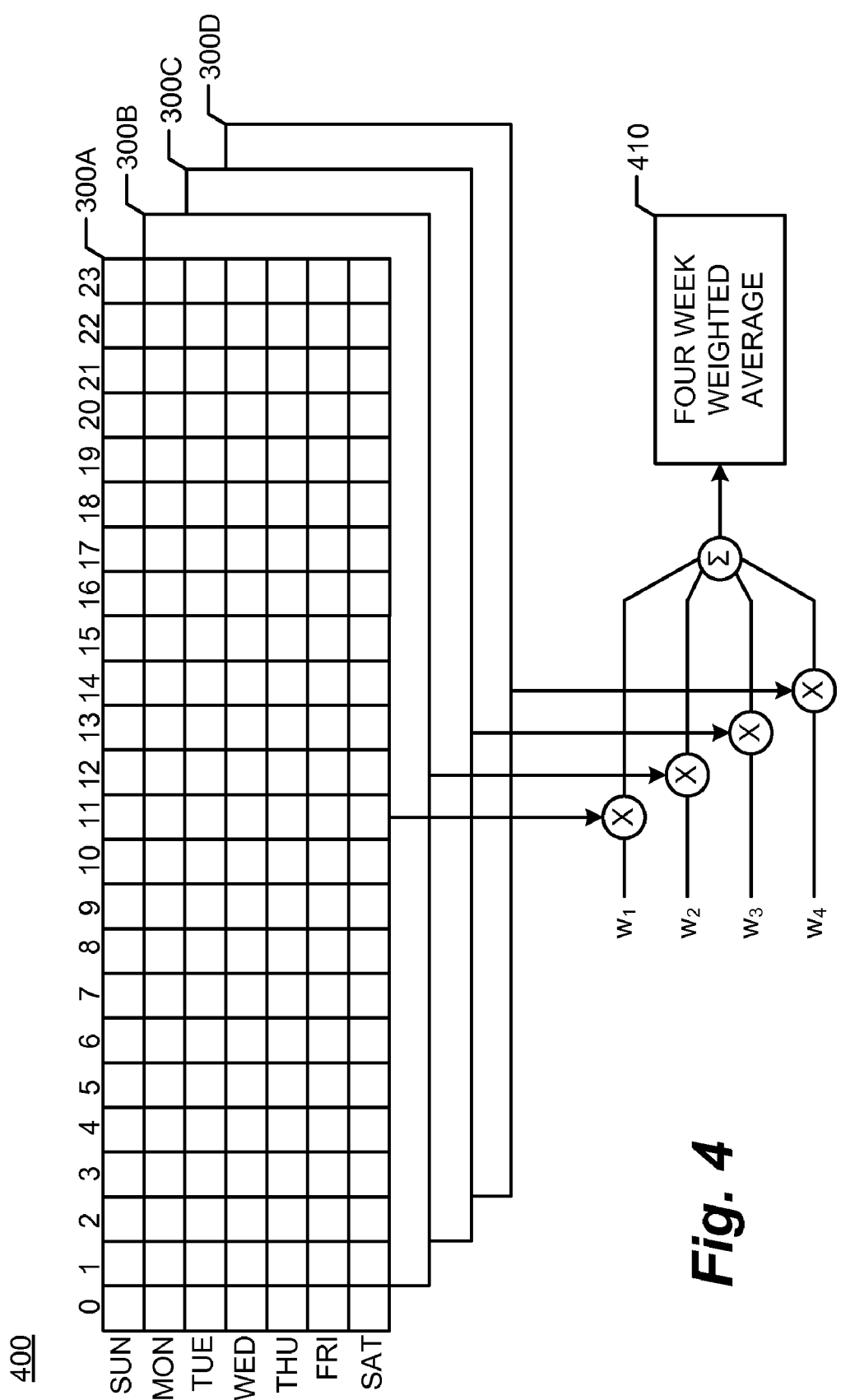
FIG. 4 is a data structure diagram illustrating a set of load statistics for a data storage system and the generation of weighted average loads over multiple weeks according to one exemplary embodiment.

Referring now to FIG. 4, a data structure diagram 400 illustrates a set of load statistics for a data storage system and the generation of weighted average loads over multiple weeks according to one exemplary embodiment. The data structure 400 can include four sets of the data structure 300, each of which can store an hourly load average for every hour of the day for one week. In other words, the data structure 400 can store hourly load data for four weeks. The data structure 400 can be visualized as four layers 300A-300D. Each one of the four layers 300A-300D can store one week worth of hourly load data. Each one of the four layers 300A-300D can be analyzed as discussed with respect to FIG. 3. For example, each layer 300A-300D can yield an hourly average 320 for Tuesday, an 8 AM average 310 over one week, or a predicted load value for a future Tuesday at 8 AM. Of course, various other times, days, or other combinations can be averaged and estimated from each layer 300A-300D as well. The data averaged or predicted from each of the four layers 300A-300D can also be averaged together to obtain predictions from a larger data set.

The value from each layer 300A-300D can also be weighted before averaging to yield a four week weighted average 410. For example, if it is desired to weight the most recent week stored in layer 300A higher than the later weeks, the following weights may be used $w_1=0.4$, $w_2=0.3$, $w_3=0.2$, and $w_4=0.1$. The weights can add up to one so that the magnitude of the prediction remains to scale. Such a weighting can put more emphasis on recent data and may be useful for adaptive load prediction in a storage system undergoing changes in system load dynamics over time. Changes affecting the present may have reached more effectiveness in recent load histories than in distant past histories. Thus, the recent data may better predict the present, or near future, than would older data in a changing system. One example of a system undergoing rapidly changing load patterns may be a new system coming on line. When the system is first set up, much of the system activity may be generated by the formatting of disks, installing of software, and so forth. These activities may gradually decrease into the steady state load dynamics for the system. Other weightings can be used as well. While the weights may be established in linear step fashion as in the example above, the weights may also be established based on examining fluctuations in the load data, or an adaptive system may vary the weights over time.

While four layers 300A-300D representing four weeks are used in the example, any number of weeks, or months, or any other temporal periods may be used to predict future loads. Using different or various periodicities of historical data than these examples does not depart from the spirit or scope of the technology presented herein.

Figure 5:
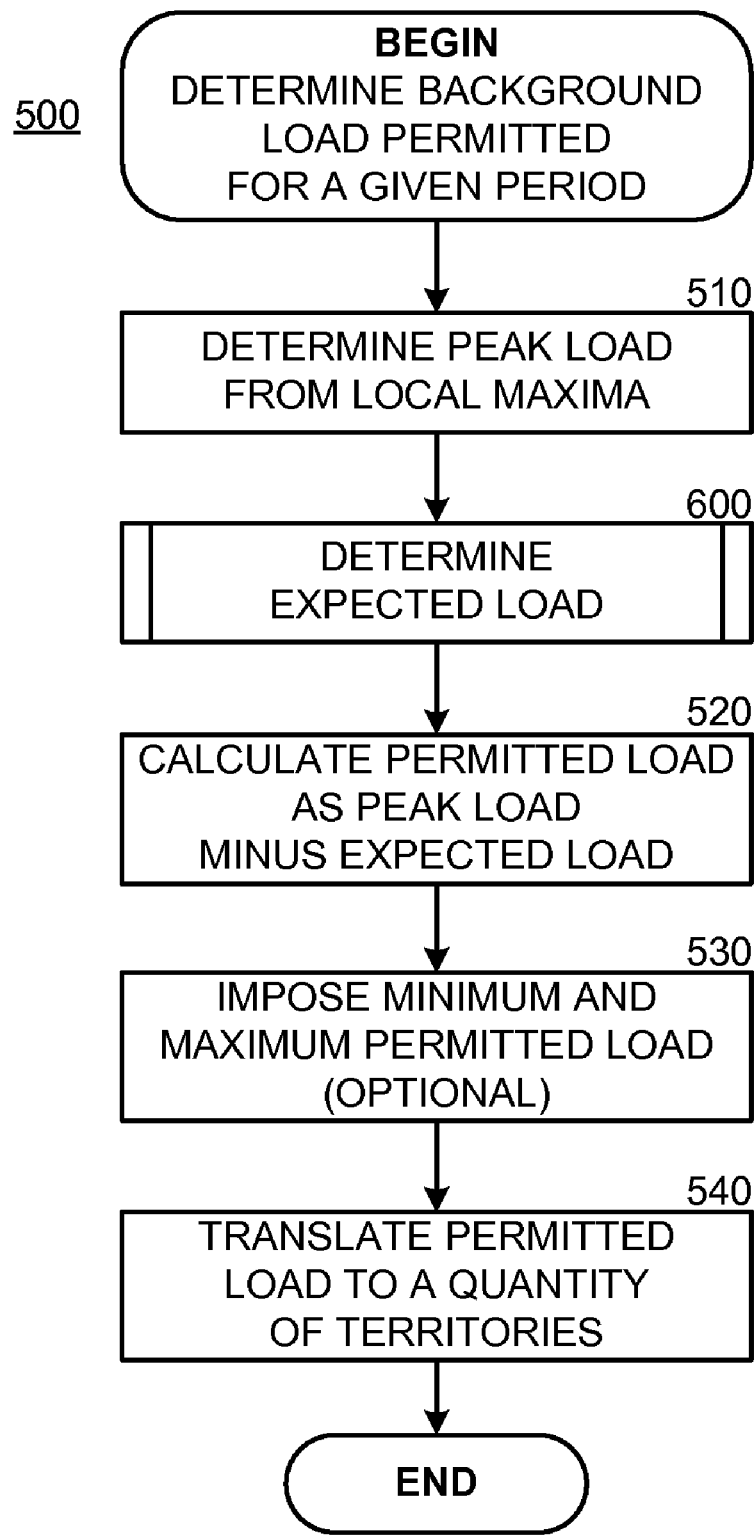
FIG. 5 is a logical flow diagram illustrating a process performed by a data storage system for determining a background load permitted for a given period according to one exemplary embodiment.

Turning now to FIG. 5, additional details will be provided regarding the embodiments presented herein for allocating background workflows in a data storage system. In particular, FIG. 5 is a flow diagram showing a routine 500 that illustrates aspects of an exemplary process performed by a storage system for determining a background load permitted for a given period. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 can be part of a workflow module that determines when to perform certain background tasks. For example, data migration, restriping, defragmentation, and so forth. The determination of permitted background load can be made periodically. For example, the permitted background load may be determined once per hour to allocate resources to background threads or modules for the next hour. Other time period granularities may be used as well.

The routine 500 can begin with operation 510 where the peak load of the system can be established. The historical load data can be examined to find the peak load, or local maxima, during a time period. For example, the time period may be over the last week. This actual peak load can serve as a proxy for the maximum load of the system. Since the peak can be determined from real production loads, it may be a more reasonable estimate of the maximum allowable load given the particular kind of load that the system is subjected to. For example, when considering I/O specific loads, the typical mix of random access versus sequential access I/O operations. The peak load, in terms of I/O loading, may be determined as a data rate such as MB/s (megabytes per second) or as a more aggregated rate such as sectors per second. Other types of system loading may be addressed in terms of the appropriate units, such as instruction counts, machine cycles, memory consumption, other similar quantities, or any combinations thereof.

Next, at operation 600 the expected load can be determined. The load can be estimated from examining historical load data, an example of which is illustrated as a subroutine 600. Further details of estimating the load are discussed with respect to FIG. 6 below. At operation 520, the permitted load is determined by subtracting the expected load from the peak load. That is, the amount of permitted background load is determined from the maximum load (as given by the local maxima load) less the expected load as determined from historical load data. At operation 530, the permitted background load can be subjected to predetermined minimum and maximum permitted load limits. This can insure that there are always at least a minimum amount of system resources dedicated to the background operations and also that the system is never overly dedicated to performing only background operations. The imposing of minimum and maximum permitted background loads is optional.

At operation 540, the permitted load can be translated from the original MB/s or sectors per second into territories per hour. This permitted load in territories per hour can be provided, for example, to a data migration module as a maximum number of territories to be migrated over the next hour. This may be referred to as the data migration quota. Where the load data is maintained on a per-volume basis, the total permitted load may be determined for all volumes in a given container or in the storage system. The routine 500 may terminate after operation 540.

A storage resource management (SRM) module can operate periodically, for example every hour, to manage the allocation of background workflow to various other modules or plug-ins. For example, data migration modules may be supplied with quotas offering each module an opportunity to move a set number of territories. If a module is unable to make use of its allocated number of data migrations, the quota of other modules or plug-ins may be increased. Although aspects specific to the example background operations of a data migration module, such as territory quotas and I/O loads, are discussed herein, it should be appreciated that data migration is only one example of a module performing background operations. Furthermore, the workflows of various other background threads or plug-in modules can be allocated using the technology discussed herein, as the permitted loads that are calculated can related to not only I/O loads, but also system loads on memory, CPU cycles, network bandwidth, caching, and so forth. The type of system loading to be considered may vary based on the system demands of the respective background operation for which resources are being allocated.

Figure 6:
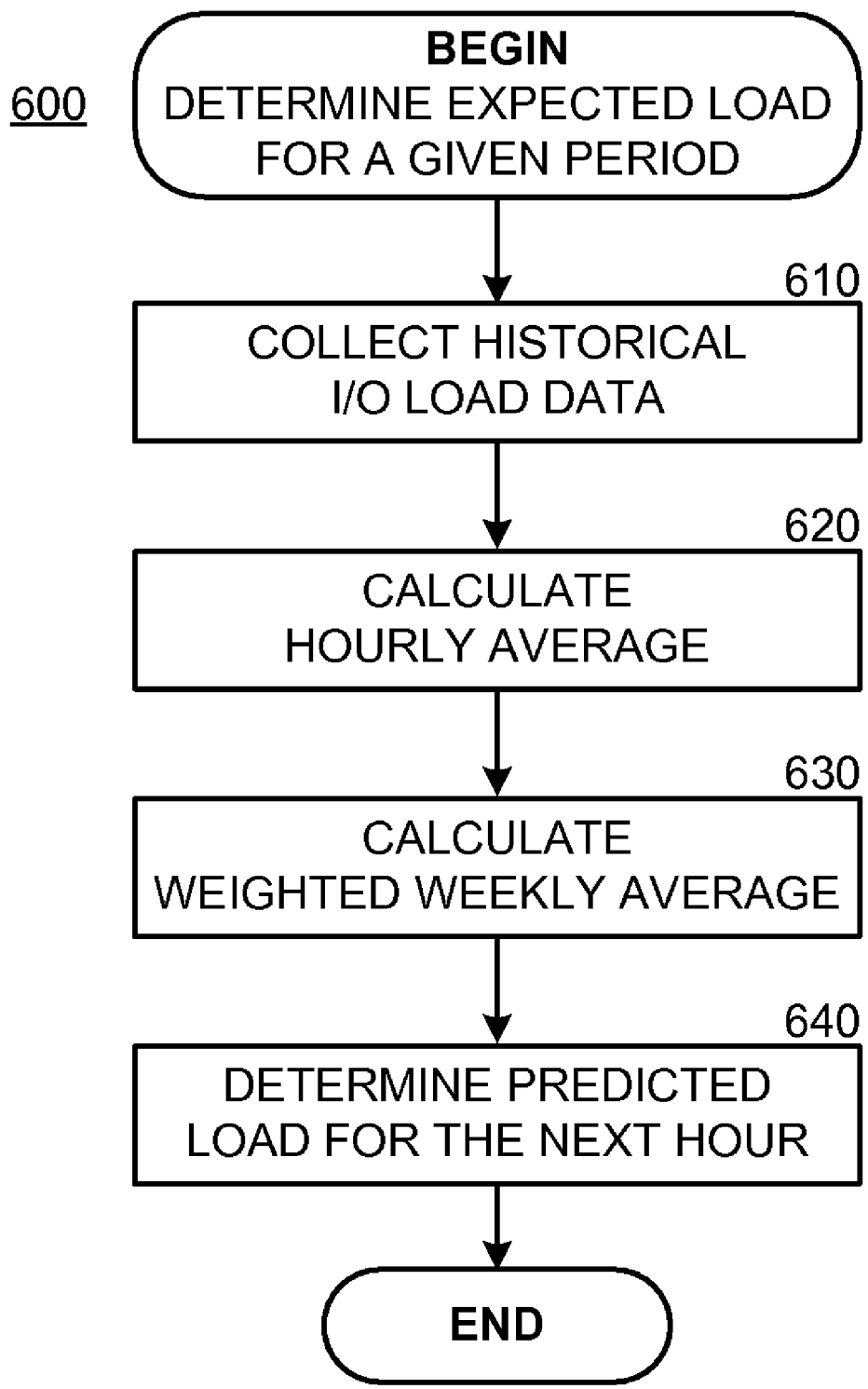
FIG. 6 is a logical flow diagram illustrating a process performed by a data storage system for determining the expected load for a given period according to one exemplary embodiment.

Turning now to FIG. 6, additional details will be provided regarding the embodiments presented herein for allocating background workflows in a data storage system. In particular, FIG. 6 is a flow diagram illustrating a routine 600 that shows aspects of an exemplary process performed by a storage system for using historical load data to estimate a load on the storage system for a future period. The routine 600 can begin with operation 610 where historical load data is collected.

The load data can be collected on a fixed periodic cycle. For example, every hour. The load data can also be maintained on multiple granularities. For example, the data collected every hour can be maintained in its entirety for the last 100 days while 1000 days worth of daily averages may be maintained from periods prior to the last 100 days. Other granularities of maintained data or quantities of maintained data for each granularity may also be used.

At operation 620, an hourly average can be calculated. The hourly average can be the average for a particular hour every day of the last week. For example, if it is currently 9 AM and the load for 10 AM is being estimated, then the 10 AM average for the last week can be calculated. At operation 630, a weighted weekly average can be calculated. The weekly average can be the average for that particular hour and that particular day of the week, for every week of the last several weeks. For example, four weeks may be used. The weekly average can be a weighted average where the values to be averaged may first be multiplied by weights. The weighting can be applied as to give more weight to recent load data and less weight to older load data. At operation 640, the hourly average and the weighted weekly average can be averaged together to provide a predicted load for the given hour and day of the week specified. Generally, the load may be predicted for the next hour so that system resources may be scheduled for background operations based on the expected load for the next hour.

Figure 7:
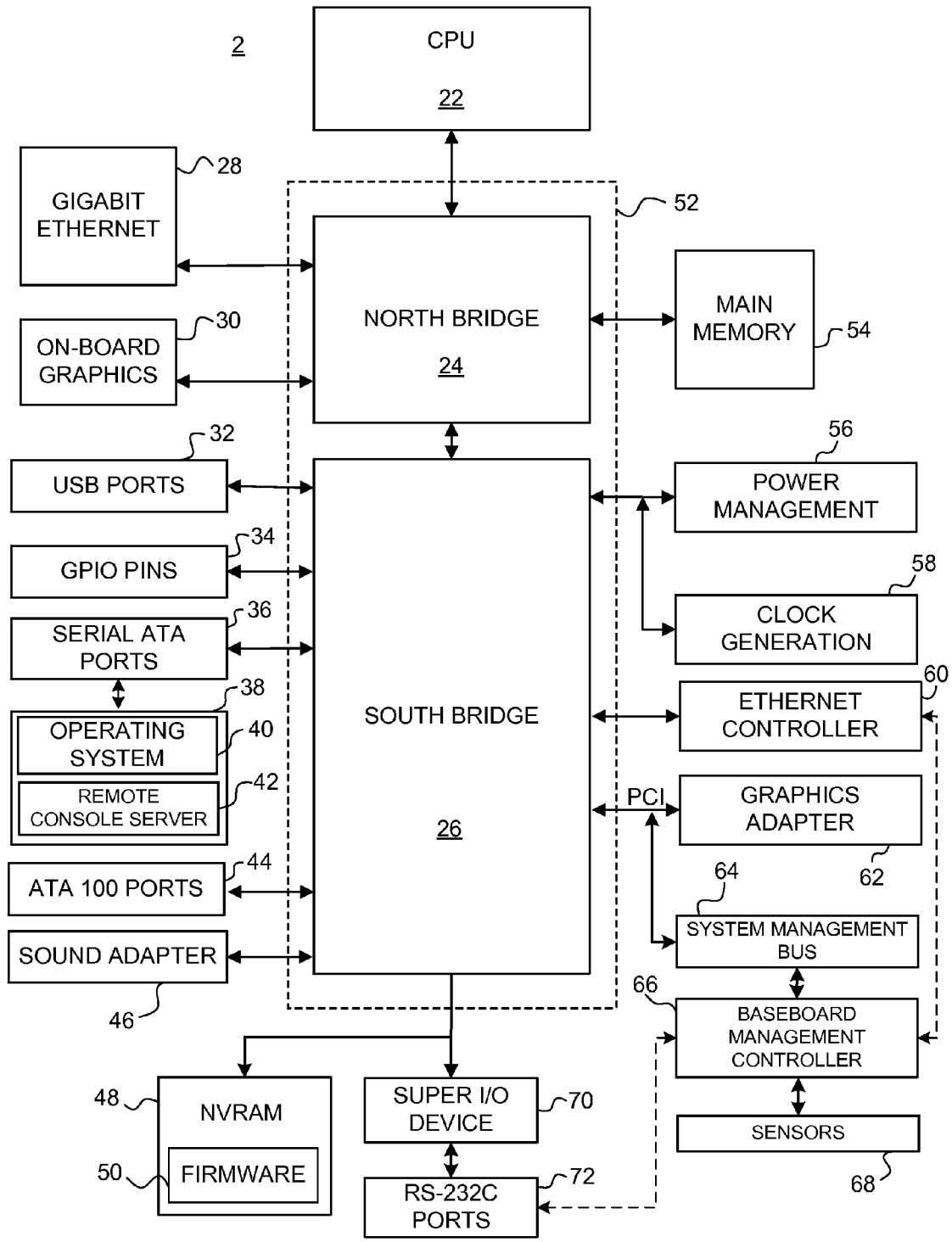
FIG. 7 is a computer architecture diagram illustrating a computer hardware architecture for a computing system capable of serving as a storage node according to one exemplary embodiment.

FIG. 7 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 7 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 7, may include other components that are not explicitly shown in FIG. 7, or may utilize an architecture completely different than that shown in FIG. 7.

Based on the foregoing, it should be appreciated that technologies for allocating background workflows in a data storage system using historical data are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for allocating background workflows in a storage system, the method comprising:
    maintaining a history of load on the storage system;
    determining a peak load from the history;
    determining an expected load by averaging periodic samples of the history, wherein the periodic samples are weighted in the expected load determination to give greater weight to more recently collected periodic samples; and
    calculating a permitted background load by subtracting the expected load from the peak load.

2. The method of claim 1, wherein the periodic samples are from a same time of day for a series of days.

3. The method of claim 1, wherein the periodic samples are from a series of hours within a same weekday.

4. The method of claim 1, wherein determining an expected load by averaging periodic samples of the history comprises averaging an hourly average of the history and a weekly weighted average of the history.

5. The method of claim 1, wherein determining a peak load from the history comprises indentifying a local maxima in a recent subset of the history.

6. The method of claim 1, further comprising translating the permitted background load to a number of data migrations for a specified time period.

7. A data storage system comprising:
    a storage subsystem;
    a plurality of physical storage devices associated with the storage subsystem; and
    one or more workflow modules operable to cause the storage subsystem to:
    maintain a history of load on a storage system;
    determine a peak load from the history;
    determine an expected load by averaging periodic samples of the history, wherein the periodic samples are weighted in the expected load determination to give greater weight to more recently collected periodic samples; and
    calculate a permitted background load by subtracting the expected load from the peak load.

8. The data storage system of claim 7, wherein the periodic samples are from a same time of day for a series of days.

9. The data storage system of claim 7, wherein the periodic samples are from a series of hours within a same weekday.

10. The data storage system of claim 7, wherein determining an expected load by averaging periodic samples of the history comprises averaging an hourly average of the history and a weekly weighted average of the history.

11. The data storage system of claim 7, wherein determining a peak load from the history comprises indentifying a local maxima in a recent subset of the history.

12. A computer storage medium having computer-executable instructions stored thereon which, when executed by a computer system, cause the computer system to:
    maintain a history of load on a storage system;
    determine a peak load from the history;
    determine an expected load by averaging periodic samples of the history, wherein the periodic samples are weighted in the expected load determination to give greater weight to more recently collected periodic samples; and
    calculate a permitted background load by subtracting the expected load from the peak load.

13. The computer storage medium of claim 12, wherein the periodic samples are from a same time of day for a series of days.

14. The computer storage medium of claim 12, wherein the periodic samples are from a series of hours within a same weekday.

15. The computer storage medium of claim 12, wherein determining an expected load by averaging periodic samples of the history comprises averaging an hourly average of the history and a weekly weighted average of the history.

16. The computer storage medium of claim 12, wherein determining a peak load from the history comprises indentifying a local maxima in a recent subset of the history.

17. The computer storage medium of claim 12, further causing the computer system to translate the permitted background load to a number of data migrations for a specified time period.

* * * * *